Dec. 6, 1966   H. BENSON   3,289,324
ARITHMETICAL TEACHING DEVICE
Filed June 4, 1964   2 Sheets-Sheet 1

INVENTOR.
HYMAN BENSON
BY
ATTORNEY

Dec. 6, 1966
H. BENSON
3,289,324
ARITHMETICAL TEACHING DEVICE
Filed June 4, 1964
2 Sheets-Sheet 2
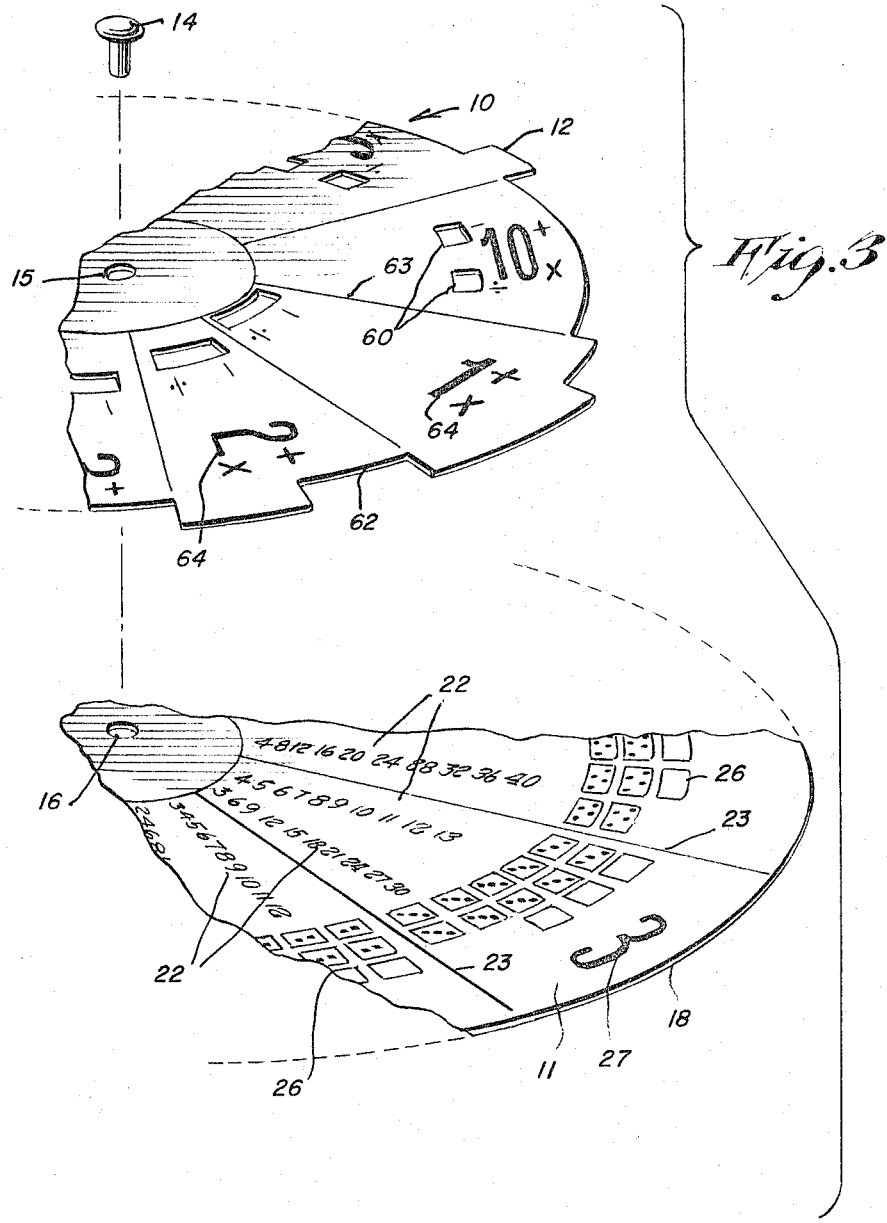
INVENTOR.
HYMAN BENSON
BY
Harry Price
ATTORNEY 3,289,324
ARITHMETICAL TEACHING DEVICE
Hyman Benson, 2121 Westbury Court, Brooklyn, N.Y.
Filed June 4, 1964, Ser. No. 372,617
1 Claim. (Cl. 35—31)

The present invention relates to an arithmetical teaching device and it also relates to a teaching device which can be used for proving answers.

It is among the objects of the present invention to provide a simple, readily manipulated, inexpensive device which may be utilized for teaching children the simple basic steps in addition, subtraction, multiplication and division.

Another object of the present invention is to provide an instruction device which can be used readily to instruct children in the basic decimal system from one to ten, and also to help children compute problems in amounts, weights, space, length, area, volume, or any other measurements.

A further object is to provide a device which will enable ready solution of simple arithmetical problems in addition, subtraction, multiplication, and division for exercises and drill purposes and provide answers to these problems, while at the same time providing the operator or user of the device with means of checking or proving the correctness of the answers to these problems.

A still further object is to provide children of school edge with experience in rational or sequence or serial counting in analytical reasoning of number concepts.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Basically, the invention of the present application resides in a use of relatively moving imprinted elements which may be in the form of printed discs, which will enable a decimal system of computation, or any other method of computation, in which the base may be 12, 20 or other numbers.

The preferred device embodies a plurality of superimposed rotatable discs. In this device one of the discs will desirably have imprinted thereon indicia and figures and another disc having spirally arranged apertures and peripheral cut away portions. The second disc mentioned will serve as a selector disc exposing to view particular numbers, figures, or indicia from the first mentioned disc.

These discs are desirably divided into sectors, these sectors having an arithmetic progression of numbers in consecutive sequence, either clockwise or counter-clockwise.

Desirably, the numbers on each disc will run in opposite directions and are so arranged when used in combination with each other that there will be provided, upon manipulation, different combinations of numbers from each of the discs, and this ever changing combinations of numbers will provide a multiple variety of problems or exercises in addition, subtraction, multiplication, or division.

With the foregoing and other objects in view, the invention consists of the novel constructions, combination and arangement of parts as hereinafter more specifically decribed, and illustrated in the accompanying drawings, wherein is shown in embodiment of the invention, but it is to be understood that changes, variations and modifications can be resorted to which fall within the scope of the claims hereunto appended.

In the drawings wherein like reference characters denote corresponding parts throughout the several views:

FIG. 3 is a fragmentary perspective separated or exploded view.

Figure 1:
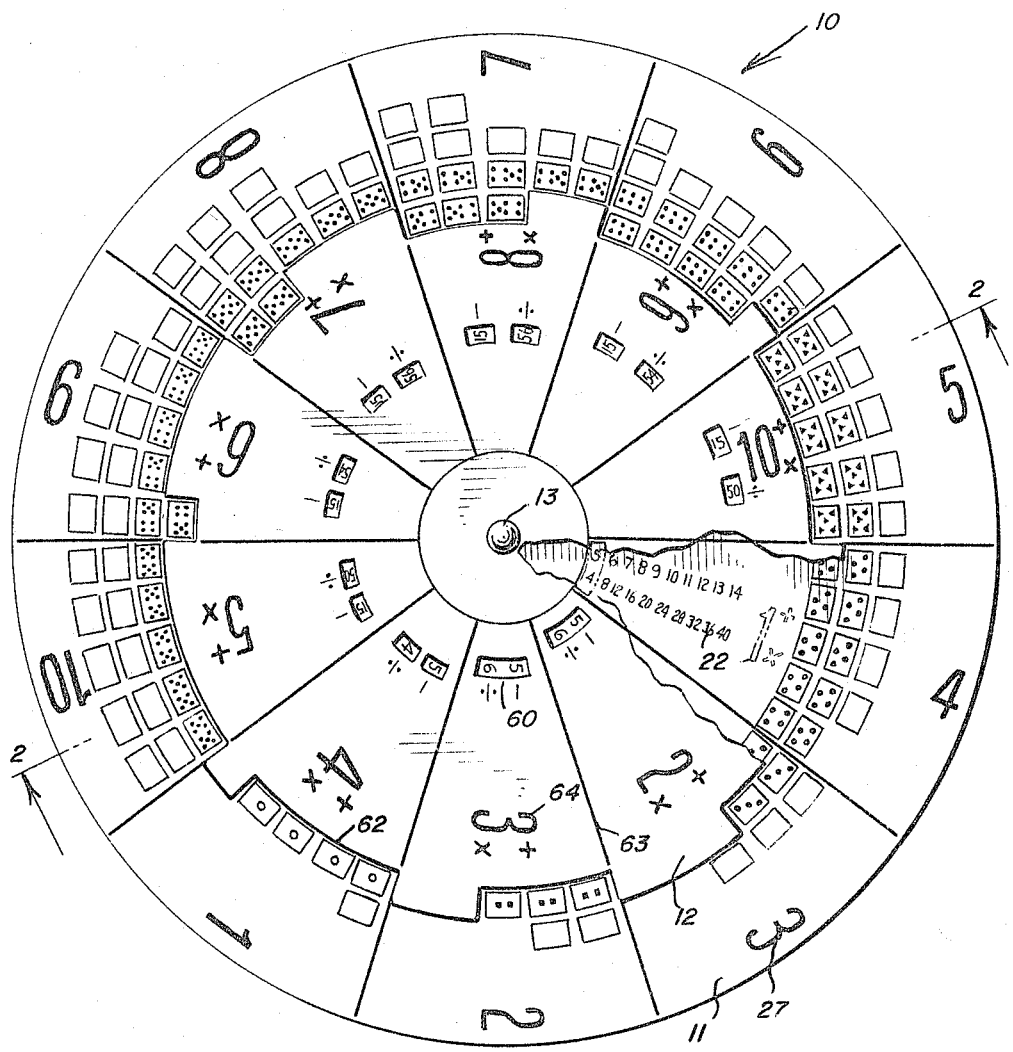
FIG. 1 is a top plan view with the upper apertured disc partly broken away to show portions of the lower imprinted disc.
Figure 2:
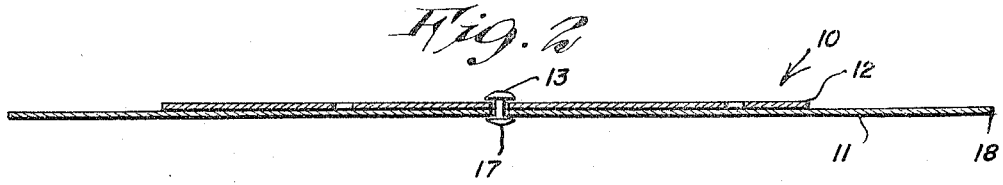
FIG. 2 is a transverse sectional view upon the line 2—2 of FIG. 1.

Referring to FIGS. 1 to 3, the complete assembly is indicated by the numeral 10 and is provided with a lower indicia or numbered disc 11 and an apertured disc 12. The discs are shown as being concentrically and pivotally fastened together by the pivot connection 13, which consists of a stud 14 and the openings 15 and 16 (see FIG. 3).

The stud may be peened over, as indicated at 17 in FIG. 2 to prevent the discs from being separated. The bottom disc is shown in the broken away portion at the left of FIG. 1, and, in the lower portion of FIG. 3, is provided with a plurality of radially outwardly extending columns 22 of numerals starting near the pivot 13 and ending near the periphery 18 of the disc 11. (See FIG. 3).

These rows of numerals 22 are separated by the sector lines 23 and they are separated from the periphery 18 by the geometrically shaped outlines 26, which may be arranged as squares, rectangles, triangles, circles or the like.

Each of these outlines 26, shown as rectangular in FIGS. 1 and 3, will contain groups or arrangements of small squares, circles, diamonds, triangles or the like, ranging from one to ten in number, and these rectangular outlines are arcuately arranged around the inside of the periphery of the disc 18, and they provide the means of checking or proving the answers.

Around the periphery and outside of these rectangular outlines are rather large and bold numerals 27 indicated for the bottom disc 11.

The top disc 12, which serves as a selector disc, has a smaller diameter than the bottom disc and it is provided with the spirally arranged apertures 60 and peripheral cut away portions 62 positioned outside of the apertures. The apertures 60 serve the purpose of automatically selecting, centering on and exposing to view the answers to problems as set forth by the manipulations of the disc 11, and said peripheral cut away portions 62 from the arc of each sector at the same time expose to view the series of units of objects, indicia or holes in the rectangular or other outlines 26.

The top disc is also provided with a series of sectors separated by the lines of separation 63 and with the bold numbers at the peripheral portion of each sector indicated at 64.

Each sector in the bottom disc will carry a bold number ranging counter-clockwise from one to ten, while each sector in the top disc will carry a bold number ranging clockwise from one to ten, so that the numbers will range in opposite directions on the inner and outer discs.

Furthermore, each sector on the bottom disc will have two rows of numerals 22, as is clearly evidenced in the cutout in FIG. 1 and in the fragmentary view of FIG. 3, which will start near the center of the disc and extend radially and outwardly towards the arc of the sector. One column of numerals in each sector may be the source of the answers in addition or subtraction problems. Another column of numerals in each sector can be the source for the answers in multiplication or division problems.

These columns may be amplified so as to give other types of answers, as where it is desirable to deal in roots, fractions, mixed numbers, percentages and the like. It will be noted that the geometrical figures 26 arranged upon the periphery of the bottom disc 11, which receive various small dots, squares, perforations, circles or other indicia, as well as several blank or open geometrical figures 26, are so positioned and arranged that they will cooperate with the peripheral edge or cutout 62 of the upper disc 12.

Desirably those rectangular figures 26 which contain indicia should be inside of the rectangles 26, which are open or blank.

Generally there are as many rectangles which are filled as there are sectors, namely ten, and on the outside of these ten there usually will be from one to ten blank geometrical figures corresponding to the bold number 27 at the periphery of the lower disc 18.

For example, in the sector 10 in FIG. 1 there will be ten filled rectangles having ten indicia in each rectangle and ten empty rectangles arcuately arranged, whereas in the first sector there will be ten rectangular designs, each carrying a single dot, circle, square or other indicia and one blank outside rectangle.

The top disc 20 will have single or double apertures closely arranged to the center or pivot 13 and the different distances from the pivot 13 will expose different numerals in the rows 22, which windows are indicated by a minus or division mark, as shown best in FIGS. 1 and 3.

These apertures are arranged close to the center at the sector indicated by the bold numeral 1 and will be successively further removed from the center as they approach the bold numeral 10.

Each of the apertures 60 specifically positioned to center on and align in register with, and expose to view, numbers, figures, or indicia 22 from the columns of said numbers, figures, or indicia on the disc 11 beneath the disc 12. Said apertures 60 permit the reading of only one number of a series or row 22 or numbers.

The first set of apertures 60 which begin the spiral will center on and expose to view the numerals or figures of the rows 22 nearest to the pivotal point 13.

The subsequent apertures 60, as they fall in the sectors with the larger bold numerals, will center on succeeding numerals in the columns 22 until the last set of apertures 60 which are nearest to the periphery of the disc, centers on and exposes to view the last numerals of the columns 22.

It will also be noted that the bold numbers in the upper disc are provided with plus and multiplication signs along the outer side thereof.

In the utilization of the device, one of the columns 22 will be used for addition and subtraction answers and this column will start with the numeral which is the same as or one higher than the bold number at the periphery of the sector.

First, to solve additional problems, sector one of the top disc 12 may be rotated to sector four of the bottom disc 11 so that the aperture would center on the numeral 5. The numeral 5 is the first number in the column 22 and is the answer to the addition 4 plus 1.

Alternately, if we rotate the top disc 12 so that the sector five of the top disc is aligned with sector four of the bottom disc 11, the aperture 60 in sector five being spaced outwardly four spaces away from the first number in the column will center on number 9 as the addition answer to 5 plus 4.

It is thus apparent that addition problems are quite simple, since all that need be done is to superimpose the sectors as shown in FIG. 1, and, as shown in this figure, 2 and 3 are 5, 6 and 9 are 15, 5 and 10 are 15, always looking in the aperture which is opposite the plus sign adjacent the bold number at the periphery of the upper disc.

To subtract, the number in the aperture 60 where the minus symbol is indicated will be the minuend. If the sector number of our top disc 12 is used as the subtrahend then the sector number of the bottom disc 11 will be the difference. Or if the sector number of the bottom disc 11 is used as the subtrahend then the sector number of the top disc 12 will be the difference.

To apply this to FIG. 1, sector nine in the top disc in FIG. 1 is the difference between #6 at the outer portion of the bottom disc 11 and #15 in the aperture indicated by the minus in the same sector. The same application may be made to the other sectors.

The column 22, which is exposed by the second or elongated aperture adjacent the division and multiplication signs will be used as a source for multiplication and division answers. This second series or row of numbers 22 will start with the number of the sector on the bottom disc 11 and continue in a progression of numbers in multiple sequence.

For example, referring to the sector 3 in FIG. 3, it will be noted that the second column 22 involves multiplying the initial 3 by 2, 3, 4, 5, 6, 7, 8, 9 and 10. This is true of each second column for each of the sectors on the bottom disc 11 and a column in each instance will start with the bold number and terminate with 10 times the bold number, so that the first number in the sector designated by the bold number 10 would start with 10 and terminate with 100.

To use this multiplication, the top disc 12 is rotated until sector numbered bold five is aligned in register with sector numbered bold 10 of the bottom disc 11, and the aperture 60 in sector five being spaced outwardly by five spaces starting with the first number in the series of numbers in the second column 22 will expose the number of the product.

In FIG. 1 there is also shown the product of the multiplication of 6 and 9, of 7 and 8, of 2 and 3, and it will be noted that these respectively are 54, 56, 6 and so forth. In each case the bold number on the bottom disc 12 may be regarded as the multiplicand.

In dividing, the bold number on the top disc, when divided into the number in the second column 22 exposed to the aperture 60, will give the result of the division in the outermost circle.

As shown in FIG. 1 at the bottom, 6 divided by 3 is 2 and at the top 56 divided by 8 is 7. By changing the relative position of the top and bottom discs, this may be varied over the entire range.

The geometrical outlines give a means of checking or proving the answers, which are observed through the aperture 60.

Each sector has ten geometrical outlines, each of which contain the same number of indicia as the bold number at the outer periphery of the bottom disc 11.

To check the multiplication of 9 times 6 in FIG. 1, for example, in the upper right hand sector, it is possible to count up the number of dots in the nine exposed rectangles, and these will come up to 54.

At the same time, to check the addition, the unmarked rectangles in the same sector will give 6, while the marked rectangles will give 9.

This is accommodated automatically by means of the cutouts at the periphery of the inside discs 12, which increase from one in the inside bold numbered sector one of the top disc 12 to ten in the sector corresponding to the bold number 10 on the inside or top disc 12.

Now to specifically prove the answers, reference may be had to sector #9 of the top disc 12, which is aligned in register with sector #6 of the bottom disc 11 in FIG. 1. There are nine filled rectangles 60 and six unfilled rectangles 60 exposed to view. If each rectangle is counted in a progressive consecutive sequence, there will be a total of fifteen rectangles, thus proving the addition answer that nine filled rectangles 60 plus six unfilled rectangles 60 equal an aggregate total of fifteen rectangles in all.

The answer 15 is in the aperture next to the minus sign.

To demonstrate a subtraction problem using these same two aligned sectors, #9 of the top disc and #6 of the bottom disc, the answer 15 in the aperture 60 next to the minus sign will be the minuend. If 9 of the top disc is subtracted from this minuend 15, the answer is the #6 found on our aligned sector of the bottom disc 11.

To check these results, there are exposed rectangles in these two aligned sectors and these 15 rectangles are used as the minuend.

On the other hand, 9 filled rectangles are the subtrahend and there are 6 unfilled rectangles as the difference. Or on the other hand if these 6 unfilled rectangles are used as our subtrahend and deducted from the minuend of 15, then the difference is 9 filled rectangles.

Thus our subtraction answers are found among the aligned sector numbers of both the top and bottom discs 11 and 12, the minuend being supplied by the aperture next to the minus sign.

To prove the multiplication problems, still assuming that sector #9 of the top disc 12 is aligned in register with sector #6 of the bottom disc 11, the answer is exposed to view in the aperture next to the division symbol, said aperture exposing the second column 22 of numbers in multiple sequence. The answer exposed to view here is 54. Therefore 9 times 6 is 54, and 6 times 9 is 54.

Thus to prove the correctness of the answer, there are 9 filled rectangles, each filled rectangle having 6 indicia or holes contained within. Thus if the indicia are counted by rectangle units in multiples of 6, the result will be nine multiples of 6 which gives an aggregate total of 54, which is the correct product of 6 times 9. The multipler will be the number of the aligned sector on the bottom disc.

To prove that 9 times 6 also makes 54 by selecting the sector having the multiplier 9 on the bottom disc, in which case the rectangles have 9 indicia or holes enclosed within each rectangle, there is a total of 6 exposed rectangles. Counting in multiples of 9, there will be an aggregate total of 54. Thus we prove that 9 times 6 also makes 54.

To further prove the answer, the individual indicia in each of these aligned sectors 6–9 or 9–6 may be counted to arrive at the aggregate sum of 54.

Either way of proving the answer, by counting in a consecutive sequence or a multiple sequence, is satisfactory.

To prove division, the method used for multiplication is reversed. Using the aligned sectors of 9 of the top disc and six of the bottom disc, the dividend 54 is in the aperture next to the division sign. The rectangles in this aligned sector have 9 exposed rectangles, each rectangle being provided with a series of 6 indicia contained within. The aggregate amount of indicia contained in these 9 rectangles is 54.

Therefore 54 indicia, the dividend, is divided equally among 9 rectangles, the divisor, and the answer is 6 indicia, the quotient. Or if on the other hand, starting with 6 indicia, the divisor, contained in one rectangle, nine equally filled rectangles are needed to reach a total of 54 indicia, the dividend.

Therefore, there is provided an arithmetical teaching device that calculates and gives answers to simple problems by apertures which expose to view specific numerals related to particular problems posed by the manipulation of said device and also provides for checking or proving said problems, through the use of said rectangles both filled and unfilled.

It is to be understood that in lieu of one to ten sectors, squares, or other markings or sub-divisions, one to twelve, one to twenty, zero to ten, zero to twelve or zero to twenty may be employed.

The geometrical outline, shapes may be rectangles, triangles, polygons, circles or other shapes.

The geometrical outlines will contain indicia such as dots, squares, circles, stars or other markings and the number of markings in each outline shall tally with the bold number in the sector, for example six markings being in the bottom sector boldly numbered six.

These outlines although shown adjacent the periphery of the bottom disc may be arranged radially or adjacent the center of the disc.

The sectors 1 to 10, 1 to 12, 1 to 20 or so forth may be amplified by adding a zero sector having no geometrical outlines and no radial rows of numbers to demonstrate the value of zero. In this case a bold zero will be placed in the zero sector.

Instead of discs, it is also possible to use sliding upper and lower cards which may be rectangles, the top card having apertures and bold indicator numbers and the lower card carrying the numbers and geometrical outlines having rectangular sectors with bold indicator numbers.

As many changes could be made in the above arithmetical teaching device, and many different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

A calculating and proving instrument for the introduction and solving of problems in simple arithmetic wherein two values are known and a third value is to be solved, comprising a pair of discs, one disc concentrically mounted and journaled to the other, both discs divided into a plurality of radial sectors, each disc having an equal amount of sectors, each sector separated from its adjoining tangent sector by outwardly extending radial lines from hub to periphery, the radial lines of both discs aligning in register, each sector of both discs being numbered in a consecutive sequence, the under disc having a plurality of radially arranged columns of numerals in each sector and geometrically shaped outlines circularly arranged around the periphery in annular rings, the inner circular arrangement of geometrically shaped outlines filled with indicia, the outer circular arrangement of outlines devoid of indicia, the upper disc having a plurality of apertures radially arranged in spiral form beginning near the center of said disc and in each consecutively numbered sector the aperture being positioned one space outwardly from the afore mentioned apertures and extending progressively toward the periphery of said disc, each of the apertures specifically positioned to center on and expose to view only one row of numerals of a series of numerals in a particular column from the plurality of columns of the under disc, the periphery of said upper disc having specific portions cut away in each sector to expose particular amounts of filled geometrically shaped outlines agreeing in amount with the designated number of that sector, said upper disc concealing the remainder of said filled outlines and revealing all the unfilled outlines, the numerals exposed in the apertures representing the answers by means of numerals and the particular specific exposed groups of geometrically shaped outlines both filled and unfilled and the indicia contained in the filled outlines representing the tally of indicia agreeing in amount with the numerals exposed thereby proving the answers with an agreeing tally.

References Cited by the Examiner

UNITED STATES PATENTS

| | | | |
|---|---|---|---|
| 784,660 | 3/1905 | Chritton | 35—31.1 X |
| 1,161,381 | 11/1915 | Duffy | 35—31.1 X |
| 1,457,223 | 5/1923 | Gallup | 35—74 |
| 1,810,153 | 6/1931 | Aker | 235—116 X |

FOREIGN PATENTS

| | | |
|---|---|---|
| 180,102 | 5/1922 | Great Britain. |
| 183,999 | 8/1922 | Great Britain. |

EUGENE R. CAPOZIO, *Primary Examiner.*

W. GRIEB, *Assistant Examiner.*